No. 835,467. PATENTED NOV. 6, 1906.
W. K. RANKIN.
ENGINEER'S VALVE.
APPLICATION FILED JAN. 3, 1906.
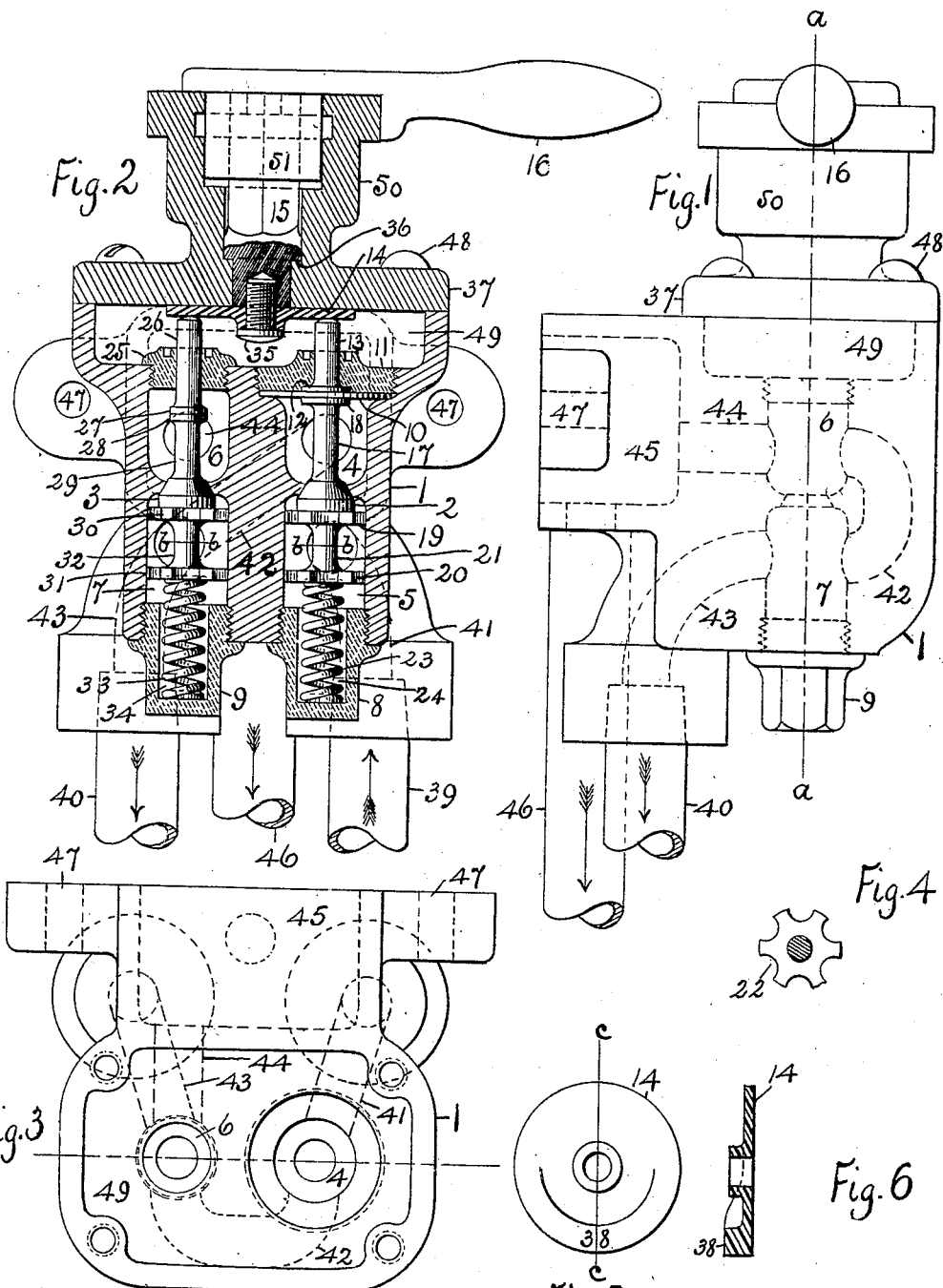
Witnesses.
Henry F. Colvin
Harry W. Young
Inventor.
William K. Rankin
By R. C. Wright
Atty.

UNITED STATES PATENT OFFICE.

WILLIAM K. RANKIN, OF PHILADELPHIA, PENNSYLVANIA, ASSIGNOR TO JOHN E. REYBURN, OF PHILADELPHIA, PENNSYLVANIA.

ENGINEER'S VALVE.

No. 835,467.  Specification of Letters Patent.  Patented Nov. 6, 1906.

Application filed January 3, 1906. Serial No. 294,379.

*To all whom it may concern:*

Be it known that I, WILLIAM K. RANKIN, a citizen of the United States, residing at Philadelphia, in the county of Philadelphia and State of Pennsylvania, have invented certain new and useful Improvements in Engineers' Valves, of which the following is a specification.

This invention is for the regulation of air-brakes, to control the admission of pressure to the jam-cylinders by a valve located in a vertical position, in a case, with another similar valve in the case, which controls the exhaust, to release the brakes. By placing the valves for vertical movement and having a valve for each purpose, there is more delicacy of action, less friction, and easier adjustment than with valves for this purpose where one valve is employed and having a rotatable movement, and these valves are less liable to leakage than the rotatable valves.

The valves are further described in the specification, and illustrated in the accompanying drawings, wherein like parts are indicated by like reference characters throughout the views, in which—

Figure 1 is a side view of the case, with the internal arrangement of chambers and passages shown in dotted lines, the valves being omitted. Fig. 2 is a section on line *a a*, Fig. 1, with the valves not in section. Fig. 3 is a top view of the case with the cover and valve removed. Fig. 4 is a section on lines *b b*, Fig. 2. Fig. 5 is a plan of the cam which operates the valve-stems viewed from the under or operative side. Fig. 6 is a section on line *c c*, Fig. 5.

A case 1 is provided within which the valves are located in vertical position, the valve 2 being for inlet and the valve 3 for outlet. Valve 2 is placed to intercept the passage between an upper chamber 4 and a lower chamber 5, while valve 3 is placed to intercept the passage between an upper chamber 6 and a lower chamber 7. The chambers 5 7 have removable closures 8 9. Chamber 4 is closed by a flexible diaphragm 10, held by a nut 11, screwed into the case 1 to firmly secure the edge of the diaphragm air-tight to the case while permitting its central part to yield to the pressure brought upon it by flange 12 of auxiliary stem 13, guided in nut 11 and subjected to movement by the cam 14, operated by stem 15 and handle 16. Valve 2 has a stem 17 with a flange 18, which bears against diaphragm 10 opposite flange 12 of auxiliary stem 13. Valve 2 is guided by flanges 19 20, closely fitting within chamber 5, the flanges being connected by a body 21 and having recesses 22 for air-passage, as seen in Fig. 4, and a spring 23, seated in pocket 24 of closure 8, abuts flange 20 to hold the valve to its seat when it is not subjected to pneumatic pressure. Chamber 6 is closed by a screw-threaded guide 25 for auxiliary stem 26, also subjected to movement by cam 14 and having a flange 27 at its lower end abutting a flange 28 of stem 29 of the valve 3. In case of a deviation in alinement flanges 27 28 will automatically adjust themselves to prevent the unseating of the valve or causing friction.

Valve 3 has flanges 30 31, body 32, spring 33 in pocket 34 for the same purposes as already described for valve 2.

Cam 14 is secured to stem 15 by a screw 35, the stem being shouldered at 36 in cover 37, and a raised portion 38 on the cam with inclined ends (see Figs. 5 6) forces down stem 13 or 26, according to which way handle 16 is turned.

Case 1 has an inlet-pipe 39 from an air-reservoir (not shown) and a pipe 40 leading to jam-cylinders. (Not shown.) From pipe 39 there is a passage 41 to chamber 5 under valve 2. Another passage 42 leads from chamber 4 above valve 2 to chamber 7 under valve 3, and a passage 43 leads from chamber 7 to pipe 40, so that when handle 16 is turned to open valve 2 and establish communication between chambers 5 4 air-pressure will pass direct from the reservoir to the jam-cylinders and apply the brake. When handle 16 is oppositely turned, valve 2 will be automatically closed by the pressure in chamber 5 and valve 3 will be operated to establish communication from pipe 40 and chamber 7 to chamber 6 and therefrom to passage 44, chamber 45, and pipe 46 to the atmosphere for the release of the brake.

The exhaust-chamber 45 will be closed at its back by attachment to the car-dasher or by a plate secured by bolts through holes 47, according to circumstances of location. Cover 37, held by screws 48, when removed gives access to chamber 49. Hub 50 receives stem 15 and hub 51 of handle 16, which are arranged to prevent tampering with the valves when the handle is removed.

I claim—

1. In a valve, a suitable case having inlet and outlet connections, and vertically-operative valves, a chamber above and below each valve, the communication between the upper and lower chambers being controlled by the valves, guides for the valves, stems for the valves, a flexible diaphragm engaging one of the stems and forming an air-tight closure for a chamber, auxiliary stems, and means to alternately operate the auxiliary stems, the diaphragm and the valves, as and for the purposes set forth.

2. In a valve, a suitable case having inlet and outlet connections and vertically-operative valves therein, a chamber above and below each valve and controlled as to communication by the valves, resilient means to close the valves, guides for the valves, stems for the valves, a flexible diaphragm engaged by one of the stems, means to press the diaphragm edges air-tight, an auxiliary stem guided to engage the opposite side of the diaphragm, an auxiliary stem for the other valve, a guide therefor, and a cam adapted to engage the auxiliary stems, with means whereby the cam alternately operates the stems and valves.

3. In a valve, a case, a series of superimposed chambers therein, an air-passage to one series, an air-passage between the series, an air-passage from the opposite series, an intercepting valve controlling the passage between the chambers of each series, and means to alternately operate each valve.

4. In a valve, a case having a series of intercommunicating chambers, an upper and a lower chamber in each series, a valve interposed between each upper and lower chamber, an air-inlet to one of the lower chambers, an air-outlet to the opposite lower chamber, a passage from the chamber above the inlet to the chamber having the outlet, a passage from the chamber above the outlet to the atmosphere, and means for the alternate operation of the valves aforesaid as and for the purposes set forth.

In testimony whereof I affix my signature in presence of two witnesses.

WILLIAM K. RANKIN.

Witnesses:
WILLIAM C. STOEVER,
R. C. WRIGHT.